(12) United States Patent
Ning

(10) Patent No.: US 11,358,458 B2
(45) Date of Patent: Jun. 14, 2022

(54) CAR COVER ASSEMBLY AND A METHOD OF USING THE SAME

(71) Applicant: Zhongxiong Ning, Guangzhou (CN)

(72) Inventor: Zhongxiong Ning, Guangzhou (CN)

( * ) Notice: Subject to any disclaimer, the term of this patent is extended or adjusted under 35 U.S.C. 154(b) by 252 days.

(21) Appl. No.: 16/745,367

(22) Filed: Jan. 17, 2020

(65) Prior Publication Data

US 2020/0247223 A1    Aug. 6, 2020

(30) Foreign Application Priority Data

Feb. 1, 2019 (CN) .......................... 201920183888.5

(51) Int. Cl.
*B60J 11/04* (2006.01)
*B60J 11/02* (2006.01)

(52) U.S. Cl.
CPC ................ *B60J 11/04* (2013.01); *B60J 11/02* (2013.01)

(58) Field of Classification Search
CPC .............. B60J 11/00; B60J 11/02; B60J 11/04
USPC ........ 296/98, 136.01, 136.04, 136.1, 136.13; 150/154, 166
See application file for complete search history.

(56) References Cited

U.S. PATENT DOCUMENTS

| | | | | |
|---|---|---|---|---|
| 4,154,254 A | * | 5/1979 | Spencer ................ | E04H 15/06 135/120.1 |
| 5,364,155 A | * | 11/1994 | Kuwahara ............... | B60J 11/00 296/136.04 |
| 5,368,912 A | * | 11/1994 | Reaves ................ | A47C 31/116 428/192 |
| 5,409,286 A | * | 4/1995 | Huang ................ | B60J 11/00 150/166 |
| 5,855,406 A | * | 1/1999 | Vargo ................ | B60J 11/02 296/136.03 |
| 6,092,857 A | * | 7/2000 | Rivas ................ | B60J 11/02 296/136.04 |
| 7,967,366 B1 | * | 6/2011 | Tellez ................ | B60J 11/02 296/136.02 |
| 9,701,185 B1 | * | 7/2017 | Usanga ............... | B60J 11/02 |
| 2005/0121937 A1 | * | 6/2005 | Hudgins ............... | B60J 11/00 296/98 |
| 2005/0127710 A1 | * | 6/2005 | Rhea ................ | B60J 11/00 296/136.04 |
| 2013/0300149 A1 | * | 11/2013 | Dao ................. | B60J 11/04 296/136.04 |
| 2017/0217295 A1 | * | 8/2017 | Tran ................. | B60J 11/02 |
| 2017/0303699 A1 | * | 10/2017 | Howe ................ | A47C 31/11 |

FOREIGN PATENT DOCUMENTS

WO    WO-2017125032 A1 * 7/2017 ............. B60J 11/04

OTHER PUBLICATIONS

Xiangming, Liao; English Translation of "Fully-Automatic Protective Cover for Automobile"; Jul. 2017; WOIP (Year: 2017).*

* cited by examiner

*Primary Examiner* — Joseph D. Pape
*Assistant Examiner* — Veronica Marie Shull

(57) ABSTRACT

A car cover assembly, having a base, a cover body, a cap and a storage body for the cover body; the base is removably mounted onto a car surface; the cap is removably or fixedly connected to the base; the cover body and the storage body are pressed between the base and the cap; the base and the cap clamp and fix the cover body and the storage body; after the cover body is completely folded, it is stored inside the storage body. The car cover assembly can be placed at anywhere on the car for use. A method of using the car cover is also provided.

5 Claims, 5 Drawing Sheets

CAR COVER ASSEMBLY AND A METHOD OF USING THE SAME

BACKGROUND OF THE INVENTION

The present invention relates to a kind of car protection product, and more specifically relates to a car cover assembly and a method of using the same.

A car cover is a product commonly used for car protection. When the car is parked outdoor, the car cover shrouds the outer side of the car to effectively reduce damages of the paints on the car, dashboard, and interior deco of the car due to direct sunlight, and protect the surfaces of the car from acid rain, bird poop, wind and sands, and damages caused by passers-by. Particularly in summer, a car cover can block a certain amount of heat from the sun to avoid searing heat inside the car.

An existing car cover assembly has a generally simple structure, comprising mainly a cover body that shrouds the car, and a tightening strap provided at an opening of a lower side of the cover body. During actual use, unfold the cover body, and then shrouds the outer side of the car from the top using the cover body so as to cover the car entirely, and finally tighten the tightening strap to avoid the cover body from being blown away. Use of such an existing car cover has the following disadvantages: Firstly, after the cover body is unfolded, the cover body slides freely on the car surfaces, and so the user is always required to move around the car many times to hold it in place before it can entirely cover the car, and such operation is extremely inconvenient. Secondly, after the cover body is used for a considerable period of time, its outer surface is covered with plenty of dust and dirt, but it is difficult to clean the cover body frequently. Dust and dirt may very easily stick onto the hands and clothes of the user during use of the car cover, and this affects the user's experience, which leads to many users preferring the car cover to be left idled in the trunk. Thirdly, since the car cover is soft, it is difficult to fold it back into its original folded shape after it is unfolded, also, since the car cover is loosened, larger space is required to store the cover body after use, and further it is difficult to take it out again. Besides, dust and dirt on the cover body may affect the environment in which it is stored, for example, the trunk.

In order to overcome the disadvantages of difficult use and inconvenient storage of an existing car cover, CN204055273U discloses a kind of automobile cover assembly, mainly comprising a structure shown in FIG. 1 to FIG. 3. As shown, the automobile cover comprises a cover unit 10 and a storage unit 20, wherein the cover unit 10 (stored inside the storage unit 20, and therefore not shown in FIG. 2) can cover the surfaces of an automobile 40; the storage unit 20 is fixed at a rear portion of the car to store the cover unit 10 in order when it is not used. The storage unit 20 comprises a storage body 21 and at least one fixing element 22 connected to the storage body 21, wherein each fixing element 22 has a free end to fix the storage unit 20 to the automobile 40, so that during the process when the user covers the automobile 40 using the cover unit, the fixing element 22 fix the position of one end of the cover body 11 relative to the automobile 40, such that the user can drag the cover body 11 using a dragging element 12 to conveniently cover the automobile 40 using the cover unit. To a certain extent, this kind of car cover can limit the loosened condition of the car cover and its free sliding over the automobile during use, thus solving the problem of positioning the car cover. However, the car cover is fixed at the rear portion of the car. Therefore, to cover the entire car, the car cover is required to be dragged to the front portion of the car which requires the car cover to travel the entire length of the car to reach the front portion of the car and cover the entire car. During the travel of the car cover, it is very likely that the car cover may fall off from the two sides of the car. Further, the position which the car cover is fixed cannot be adjusted according to practical needs, and thus not adaptable to different habits of use (e.g. fixed at the front cover of the car or dragged from the top cover of the car). Besides, the way of fixing the car cover is also not flexible enough, wherein the fixing element 22 fixed inside the automobile may occupy plenty of inner space of the car. If the car cover should be entirely taken out and stored somewhere else, it has to be disengaged from the fixing element 22, but such operation is complicated and inconvenient.

BRIEF SUMMARY OF THE INVENTION

In view of the aforesaid disadvantages now present in the prior art, it is an object of the present invention to provide a car cover assembly which is structurally sound and convenient to use.

Another object of the present invention is to provide a method of using said car cover assembly.

The present invention is achieved as follows:

A car cover assembly, comprising a base, a cover body, a cap and a storage body that stores the cover body; the base is removably mounted on a car surface; the cap is removably or fixedly connected onto the base; the cover body and the storage body are pressed between the base and the cap; the base and the cap clamp and fix the cover body and the storage body; the cover body is entirely stored inside the storage body when being completed folded.

Preferably, an upper surface of the base is provided with a buckling groove or a buckle; correspondingly, a lower surface of the cap is provided with a corresponding buckle or a corresponding buckling groove; the buckle provided on one of the base or cap is fitted into the corresponding buckling groove provided on another one of the base or cap so that the cap is removably fitted onto the base, thereby clamping and fixing the cover body and the storage body between the base and the cap.

Preferably, an upper surface of the base is provided with a tenon or a mortise; correspondingly, a lower surface of the cap is provided with a corresponding mortise or a corresponding tenon; the tenon provided on one of the base or cap is fitted into the corresponding mortise provided on another one of the base or cap so that the cap is removably fitted onto the base, thereby clamping and fixing the cover body and the storage body between the base and the cap.

Preferably, a protrusion is configured at an outer periphery of each of the base and the cap; a locking block is also provided to lock onto the protrusions of the base and of the cap simultaneously to press and fix the base and cap against each other and also to clamp and fix the cover body and the storage body between the base and the cap.

Preferably, the base, the storage body, the cover body, and the cap are connected via adhesion, hot pressing or fusion.

Preferably, the base is provided with a first through hole; the cap is provided with a second through hole positioned correspondingly to the first through hole; the second through hole and the first through hole are connected by using a screw threaded element of a locking pin so that the cap is removably fitted onto the base, thereby clamping and fixing the cover body and the storage body between the base and the cap.

Preferably, the cover body and the storage body are pressed together as one integral structure, thus forming a three stacked layered structure having the base being a first layer, the cover body and the storage body pressed as one integral structure being a second layer, and the cap being the third layer.

Preferably, a lower surface of the base is provided with vacuum suction cups; the base adheres to the car surface via the vacuum suction cups, so that the base is removably mounted onto the car surface.

Preferably, a lower surface of the base is provided with magnetic material or an electrostatic sticker; the base adheres to the car surface through magnetic force of the magnetic material or the electrostatic sticker, thereby removably mounting the base onto the car surface.

Preferably, a lower surface of the base is provided with a self-adhesive member; the base adheres to the car surface through the self-adhesive member, thereby removably mounting the base onto the car surface.

Preferably, the base comprises a rotatable element and a fixed element; the rotatable element is connectable with the cap so as to clamp and fix the cover body and the storage body between the rotatable element and the cap; the fixed element is removably connected to the car surface via vacuum suction cups, magnetic material, electrostatic stickers or self-adhesive members; the rotatable element and the fixed element are connected directly by insertion to form a rotatable structure with the rotatable element rotatable with respect to the fixed element; alternatively, the rotatable element and the fixed element are connected via rotating components (e.g. connecting shaft and bearing) to form the rotatable structure; accordingly, the base has the fixed element removably connected to the car surface, while the rotatable element on the fixed element rotates and performs positional adjustment along with the cover body, so as to more easily adjust the cover body to a more accurate position when being used on the car, thereby reducing the amount of work and difficulty of adjusting the cover body on the car, thus providing obviously improved convenience.

Preferably, the storage body has a bag shape and is capable to be flattened; when the cover body is used over the car, the storage body is substantially flattened without obvious bulging that affects the use of the cover body; an opening of the storage body is provided with hook and loop fasteners or tightening strings; when the cover body is stored inside the storage body, the hook and loop fasteners or the tightening strings are used to close the opening of the storage body to prevent the stored cover body from falling out of the storage body.

Preferably, the storage body comprises two or more straps that cross one another at a respective middle point thereof; an intersection of the straps is connected to the cover body, and being fixed between the base and the cap; a plurality of strings or cords are used to connect every adjacent extended parts of the straps extended out of the intersection, thereby forming a net shape structure; free ends of the straps are provided with hook and loop fasteners or tightening strings for mutual connections of the corresponding ends of the straps when the storage body is pulled upward storing the cover body inside the storage body; the straps of the storage body lay flat and extend horizontally and outwardly without affecting the use of the cover body when the cover body is in use over the car; to store up the cover body, pull up the straps so that they form a shape like a meshed bowl, and the cover body is then stored inside; finally, use the hook and loop fasteners or the tightening strings provided at the end of the straps to connect the corresponding ends of the straps to complete storage of the cover body inside the storage body.

Preferably, the strings or cords connecting the straps are made of resilient material such as rubber bands or plastic bands; resilient strings or cords achieve better storage effect of the cover body since it is thus easier to open up the storage body to easily put the cover body inside; after the cover body is stored inside, the resilient force of the strings or cords maintains the cover body in a relatively small size and so the cover body will not expand the storage body from inside the storage body, thereby saving storage space and benefiting to portability and mobility of the car cover assembly.

Another object of the present invention is achieved by the following technical solution: A method of using a car cover assembly, comprising the following steps:

1. removably mounting a base on a car surface according to the need and preference of a user, so that a storage body storing a cover body of the car assembly is unable to move tangentially on the car surface;

2. opening up the storage body, unfolding the cover body, by using a portion of the base mounted on the cover body as a point of fixation, pulling and stretching out the cover body; due to the point of fixation, the cover body will not displace entirely when being pulled and stretched out, therefore the cover body is conveniently stretched out to cover the car;

3. when it is no longer required to use the cover body which then requires storage, folding the cover body into a smaller piece on the base, pulling up the storage body to include the cover body inside the storage body; and then closing an opening of the storage body so that the cover body will not fall out of the storage body;

4. separating the base from the car surface along a direction perpendicularly away from the car surface to disengage the entire car cover assembly from the car; and finally storing the car cover assembly at a desired place.

The present invention has the following beneficial effects compared with the prior art:

1. The car cover assembly of the present invention comprises a cover body and a fixed element. The fixed element can be removably connected to a car surface. When using the cover body, the cover body can be partially fixed to the car surface through the fixed element. When it is required to cover the car using the cover body, the fixed element is first being connected to a car surface to form a point of fixation, then the cover body can be unfolded and stretched out until the cover body covers the car. Since the cover body is partially fixed to the car surface through the fixed element at the point of fixation, the cover body will not be entirely displaced when pulling and stretching out the cover body, therefore, the user is only required to move around the car once in order to complete proper covering of the cover body over the car. It is no longer necessary to adjust the position of the cover body by repeated pulling adjustment around the cover body, thereby easing the operation and increasing operation efficiency. Since repeated pulling adjustment is not necessary, hands and clothes are less likely to get dirty, thereby improving user's experience. Further, the car cover assembly is not fixedly connected to a certain position of the car, it can be flexibly configured in different positions such as a front, a rear or a top portion of the car according to the user's habits, thereby increasing the adaptability of the present invention. By using a removable connection structure, the car cover assembly of the present invention can be completely taken down from the car after use, thereby providing flexible and convenient use of the car cover assembly.

2. The car cover assembly comprises a cover body, a fixed element and a storage body. The fixed element can be connected with a car surface. The storage body can be fixed to the car via the fixed element. The storage body has an opening. The cover body is connected with the storage body and can be stored within the storage body via the opening. When it is not required to use the car cover assembly, store the cover body into the storage body to prevent loosening of the cover body, to reduce the space occupied when storing the cover body, to facilitate the cover body to be taken out again for use, and to prevent dust and dirt etc on the cover body from polluting the environment in which the cover body is stored, for example a car trunk. Connection between the storage body and the cover body can effectively prevent the lost of the storage body or the need to look for the storage body when needed, also, positioning of the cover body is easier when storing the cover body into the storage body because the cover body is prevented from displacement relative to the storage body, as such the process of storing the cover body is quicker and easier.

3. The base and the cap of the car cover assembly are connected via buckle and buckling groove or tenon and mortise. Therefore, the cover body and the storage body can be effectively clamped and fixed between the base and the cap. Further, the base and the cap can be conveniently disengaged from each other without using any additional tool, and as such, the base, the cap, the cover body and the storage body can be separated. Accordingly, the cover body or the storage body, as well as the base and the cap, can be conveniently replaced, thereby easing the maintenance of the car cover assembly.

4. By using fixing members such as vacuum suction cups, magnetic material, electrostatic sticker and self-adhesive member on the base to removably connect with a car surface, the cover body and the car surface are effectively guaranteed not to be easily separable under tangential force. However, the base and the car surface are easily separable when an action force is imposed on the base along a direction perpendicularly away from the car surface. Accordingly, the stability and the ease of application of the cover body over the car can be guaranteed. Also, it can be ensured that the car cover assembly can be conveniently removed from the car after use and then be quickly stored up.

5. The base of the car cover assembly of the present invention comprises a rotatable element and a fixed element. The rotatable element is connected with the cap. The cover body and the storage body are clamped and fixed between the rotatable element and the cap. The fixed element is removably connected with a car surface. The rotatable element and the fixed element are connected via rotating components (e.g. connecting shaft and bearing). The base according to the present embodiment has the fixed element removably connected to the car surface, while the rotatable element on the fixed element can rotate and perform positional adjustment along with the cover body, so that the cover body can be more easily adjusted to a more accurate position when being used on the car, thereby reducing the amount of work and difficulty of adjusting the cover body on the car, providing obviously improved convenience 6. The storage body comprises two or more straps that cross one another at a respective middle point thereof. An intersection of the straps is connected to the cover body, and being fixed between the base and the cap. A plurality of strings or cords are used to connect every adjacent extended parts of the straps extended out of the intersection, thereby forming a net shape structure. Free ends of the straps are provided with hook and loop fasteners or tightening strings for mutual connections of the corresponding ends of the straps when the storage body is pulled upward storing the cover body inside the storage body. The straps of the storage body lay flat and extend horizontally and outwardly without affecting the use of the cover body when the cover body is in use over the car. To store up the cover body, pull up the straps so that they form a shape like a meshed bowl, and the cover body can then be stored inside; finally, use the hook and loop fasteners or the tightening strings provided at the end of the straps to connect the corresponding ends of the straps to complete storage of the folded cover body inside the storage body. The strings or cords connecting the straps are made of resilient material such as rubber bands or plastic bands. Resilient strings or cords can achieve better storage effect of the cover body. since it is thus easier to open up the storage body to easily put the cover body inside; after the cover body is stored inside, the resilient force of the strings or cords maintains the cover body in a relatively small size and so the cover body will not expand the storage body from inside the storage body, thereby saving storage space and benefiting to portability and mobility of the car cover assembly.

DETAILED DESCRIPTION OF THE INVENTION

The embodiments of the present invention will be further described clearly and thoroughly with reference to the drawings. Apparently, the described embodiments are only some but not all of the possible embodiments of the present invention. All other embodiments which can be obtained by a person skilled in this field of art without any inventive efforts based on the teachings of the embodiments of the present invention should also fall within the scope of protection of the present invention.

Embodiment 1

Figure 1:
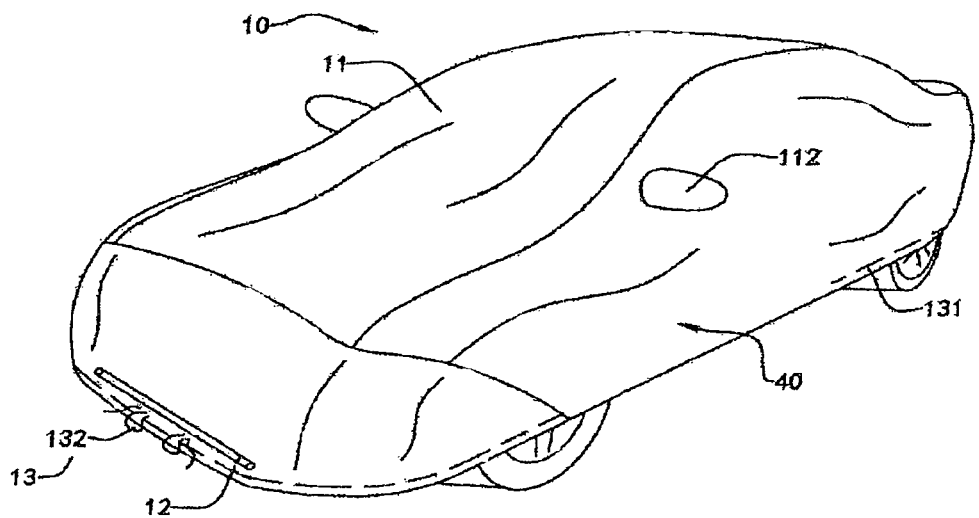
FIG. 1 shows a car cover assembly according to the prior art.
Figure 2:
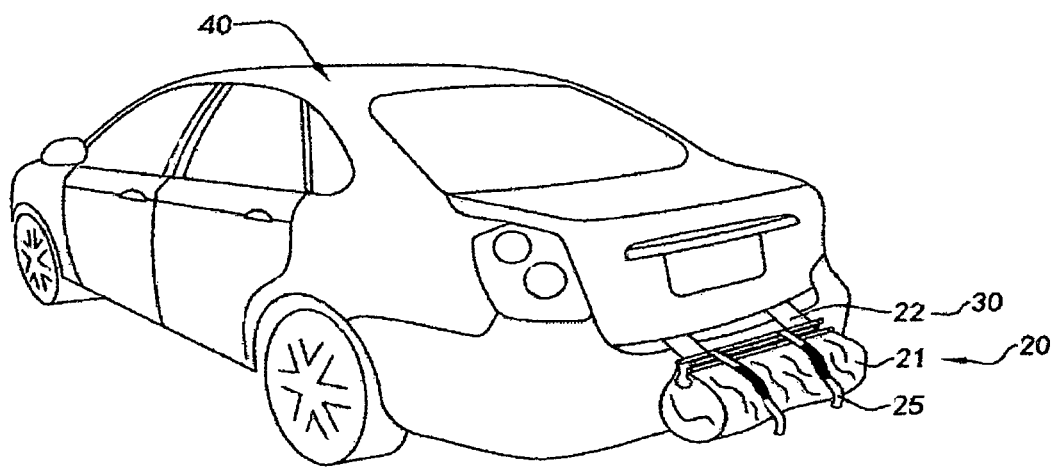
FIG. 2 shows the car cover assembly of FIG. 1 in an alternative mounting position according to prior art.
Figure 3:
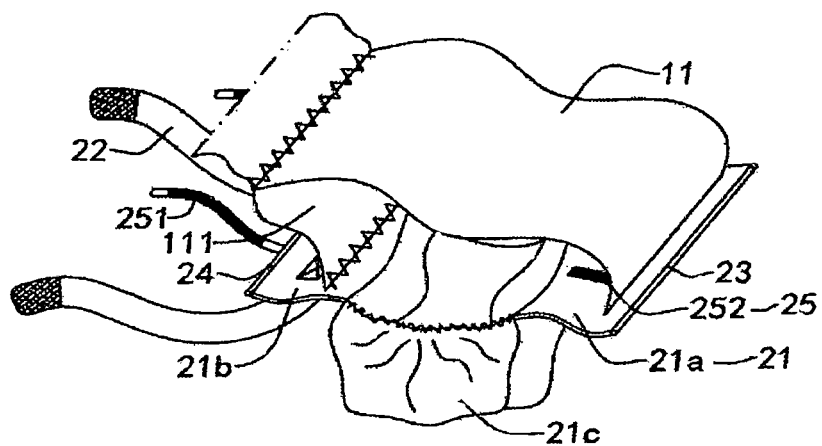
FIG. 3 is a structural view of the car cover assembly of FIG. 1.
Figure 4:
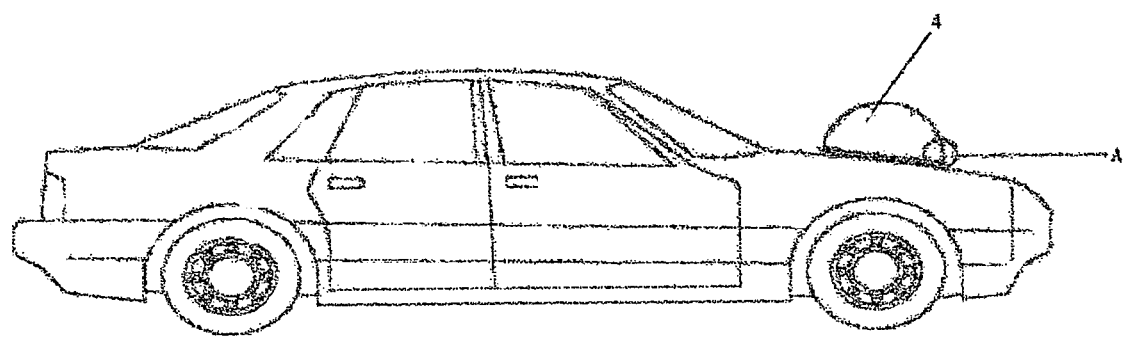
FIG. 4 shows the car cover assembly in an installed position according to the present invention.
Figure 5:
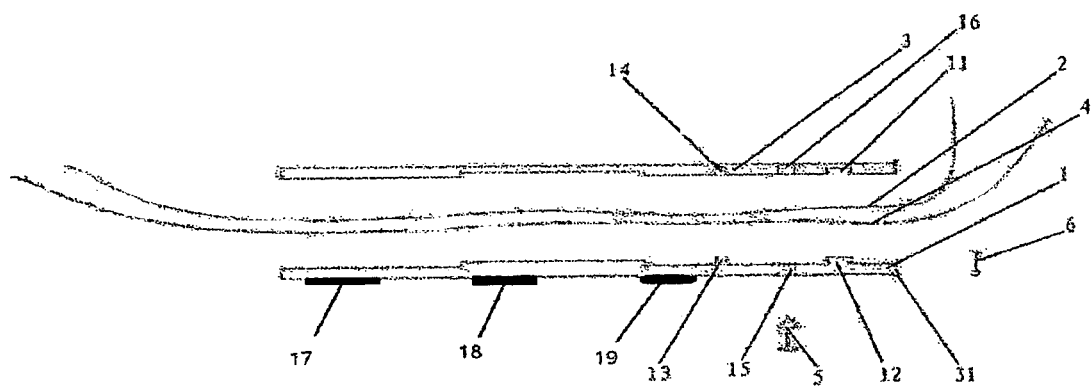
FIG. 5 is the enlarged portion A indicated in FIG. 4.

FIGS. 4-9 illustrate a detailed structure of the present invention. As shown in FIG. 4, the car cover assembly can be installed at the front portion of the car at the beginning of use. Alternatively, the car cover assembly can be positioned at a top portion or at a rear portion of the car at the beginning of use. Therefore, the present invention has a more flexible installation position which can be adjusted according to practical needs. FIGS. 4-5 illustrate the detailed structure of the car cover assembly of the present invention, comprising a base 1, a cover body 2, a cap 3 and a storage body 4 that stores the cover body 2; the base 1 is removably mounted on a car surface; the cap 3 is removably or fixedly connected onto the base 1; the cover body 2 and the storage body 4 are pressed between the base 1 and the cap 3; the base 1 and the cap 3 clamp and fix the cover body 2 and the storage body 4; the cover body 2 is entirely stored inside the storage body 4 when being completed folded (FIG. 4).

FIG. 5 shows the multiple possible connecting structures between the base 1 and the cap 3. Any one or any two or more than two of these multiple connecting structures can be used for connecting the base 1 and the cap 3. Specifically, according to a connecting structure between the base and the cap, an upper surface of the base 1 is provided with a buckling groove 11 or a buckle 12; correspondingly, a lower surface of the cap 3 is provided with a corresponding buckle 12 or a corresponding buckling groove 11; the buckle 12 provided on one of the base or cap is fitted into the corresponding buckling groove 11 provided on another one of the base or cap so that the cap 3 is removably fitted onto the base 1. When it is required to connect the cap 3 and the base 1, align the buckle 12 and the corresponding buckling groove 11 to fit the buckle into the buckling groove, thereby fixing the cap 3 onto the base 1, and hence fixing the storage body 4 and the cover body 2 to the base 1. When it is required to remove the cap 3 from the base 1, disengage the buckle 12 from the corresponding buckling groove 11 to remove the cap 3 from the base 1, thereby releasing the storage body 4 and the cover body 2 from the base 1. The above described operations are simple for convenient installation and removal.

Alternatively, a connecting structure between the base and the cap can be as follows: an upper surface of the base 1 is provided with a tenon 13 or a mortise 14; correspondingly, a lower surface of the cap 3 is provided with a corresponding mortise 14 or a corresponding tenon 13; the tenon 13 provided on one of the base or cap is fitted into the corresponding mortise 14 provided on another one of the base or cap so that the cap 3 is removably fitted onto the base 1. When it is required to connect the cap 3 and the base 1, align the tenon 13 and the corresponding mortise 14 to fit the tenon into the mortise, thereby fixing the cap 3 onto the base 1, and hence fixing the storage body 4 and the cover body 2 to the base 1. When it is required to remove the cap 3 from the base 1, disengage the tenon 13 from the corresponding mortise 14 to remove the cap 3 from the base 1, thereby releasing the storage body 4 and the cover body 2 from the base 1. The above described operations are simple for convenient installation and removal.

Alternatively, a connecting structure between the base and the cap can be as follows: the base 1 is provided with a first through hole 15; the cap 3 is provided with a second through hole 16 positioned correspondingly to the first through hole 15; the second through hole 16 is fixed in position correspondingly to the first through hole 15 by using a locking pin 5 so that the cap 3 is removably fitted onto the base 1. When it is required to connect the cap 3 and the base 1, pass through the second through hole 16 and the first through hole 15 using the locking pin 5 to fix the cap 3 onto the base 1, and hence fixing the storage body 4 and the cover body 2 to the base 1. When it is required to remove the cap 3 from the base 1, disengage the locking pin 5 out from the first through hole 15 to remove the cap 3 from the base 1, thereby releasing the storage body 4 and the cover body 2 from the base 1. The above described operations are simple for convenient installation and removal.

Alternatively, a connecting structure between the base and the cap can be as follows: a protrusion 31 is configured at an outer periphery of each of the base 1 and the cap 3; a locking block 6 is also provided to lock onto the protrusions 31 of the base 1 and of the cap 3 simultaneously to press and fix the base 1 and cap 3 against each other and also to clamp and fix the cover body 2 and the storage body 4 between the base 1 and the cap 3. When it is required to connect the cap 3 and the base 1, placing the cap 3 over the base 1, and then using the locking block 6 to lock against the protrusions 31 of the base 1 and of the cap 3 simultaneously. Due to position limiting function of the locking block 6, the cap 3 is tightly pressed against the base 1, thereby fixing the storage body 4 and the cover body 2 to the base 1. When it is required to remove the cap 3 from the base 1, disengage the locking block 6 from the protrusions 31 to remove the cap 3 from the base 1, thereby releasing the storage body 4 and the cover body 2 from the base 1. The above described operations are simple for convenient installation and removal.

Apart from the several connecting structures described above which also allow disconnection of the same, the storage body 4 and the cover body 2 can be connected or pressed together as one integral structure via adhesion, hot pressing or fusion, and the base 1, the storage body 4 and the cover body 2 formed as one integral structure, and the cap 3 are then connected also via adhesion, hot pressing or fusion to form three stacked non-separable layers.

A lower surface of the base 1 is provided with vacuum suction cups; the base 1 adheres to a car surface via the vacuum suction cups, so that the base 1 can be removably mounted onto the car surface. When it is required mount the base 1 onto the car surface, the user press the vacuum suction cups against the car surface to quickly adhere the base onto the car surface. By tearing off the vacuum suction cups from the car surface, the base 1 can be quickly dismounted from the car surface. Therefore, mounting and dismounting of the base 1 is conveniently achieved.

The storage body 4 has a bag shape which is capable to be flattened. When the cover body covers the car surface during use, the storage body 4 is flattened and is not so obviously bulged as to affect the use of the cover body. When the cover body is folded, the storage body 4 may adopt the bag shape to store the folded cover body 2, as shown in FIG. 4.

Figure 6:
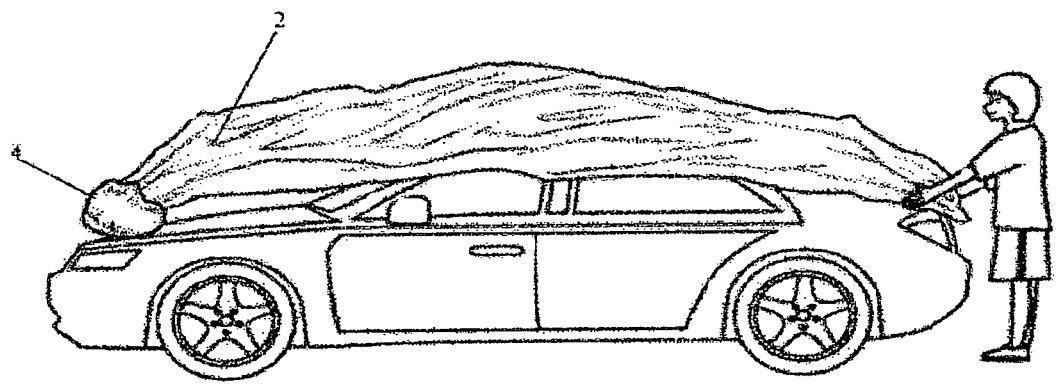
FIG. 6 shows the use of the car cover assembly of FIG. 4.

A method of using the car cover assembly, comprising the following steps:

1. Removably mounting a base 1 on a car surface according to the need and preference of a user; wherein the base 1 can be mounted at a front, top or rear portion of a car, so that a storage body 4 of a cover body 2 of the car assembly is unable to move tangentially on the car surface;

2. Opening up the storage body 4, unfolding the cover body 2, by using a portion of the base 1 that is fixed with the cover body as a point of fixation, pulling and stretching out the cover body 2; due to the point of fixation, the cover body 2 will not displace entirely when being pulled and stretched out, therefore the cover body 2 can be conveniently stretched out to cover the car (FIG. 6);

3. When it is no longer required to use the cover body 2 which then requires storage, folding the cover body 2 into a smaller piece on the base 1, pulling up the storage body 4 from a flattened condition into a bag shape to include the cover body 2 inside the storage body 4; after the cover body 2 is completely inside the storage bag 4, closing an opening of the storage body 4 by using hook and loop fastener or binding straps provided at the opening of the storage body 4, so that the cover body 2 will not fall out of the storage body 4;

4. Separating the base 1 from the car surface along a direction perpendicularly away from the car surface to disengage the entire car cover assembly from the car; and finally storing the car cover assembly at a desired place.

Embodiment 2

Same as embodiment 1 except for the following: the lower surface of the base 1 is provided with an electrostatic sticker 17; the base 1 adheres to the car surface through the electrostatic sticker 17, thereby removably mounting the base 1 onto the car surface. When it is required to mount the base 1 onto the car surface, the base 1 can be quickly adhered to the car surface by using the electrostatic sticker 17, and the base 1 can be quickly removed from the car surface by tearing off the electrostatic sticker 17 manually. Therefore, mounting and dismounting of the base are conveniently achieved.

Embodiment 3

Same as embodiment 1 except for the following: the lower surface of the base 1 is provided with magnetic material 18; the base 1 is magnetically attached to the car surface through the magnetic material 18, thereby removably mounting the base 1 onto the car surface. When it is required to mount the base 1 onto the car surface, the base 1 can be quickly attached magnetically to the car surface via the magnetic force of the magnetic material 18, and the base 1 can be quickly removed from the car surface by disengaging the magnetic material 18 manually from the car surface. Therefore, mounting and dismounting of the base are conveniently achieved.

Embodiment 4

Same as embodiment 1 except for the following: the lower surface of the base 1 is provided with a self-adhesive layer; the base 1 adheres to the car surface through the self-adhesive layer, thereby removably mounting the base 1 onto the car surface. When it is required to mount the base 1 onto the car surface, the base 1 can be quickly adhered to the car surface via the self-adhesive layer, and the base 1 can be quickly removed from the car surface by tearing off the self-adhesive layer manually from the car surface. Therefore, mounting and dismounting of the base are conveniently achieved.

Embodiment 5

Figure 7:
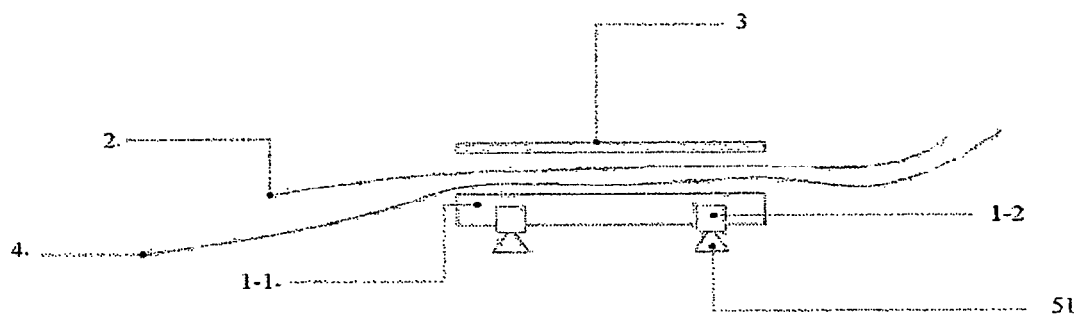
FIG. 7 shows the car cover assembly of FIG. 4 wherein the base of the car cover assembly is provided with a rotatable structure.
Figure 8:
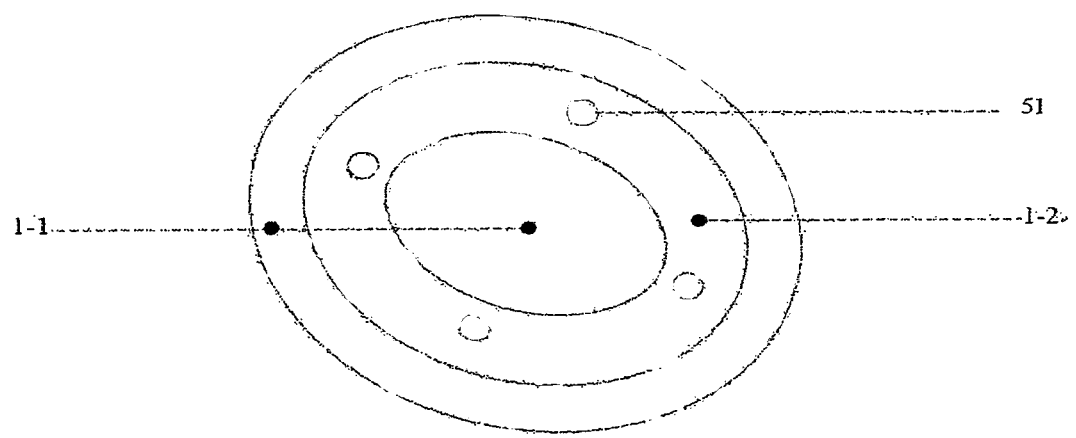
FIG. 8 is a bottom view of the base of the car cover assembly as shown in FIG. 7.

Same as embodiment 1 except for the following: The base 1 comprises a rotatable element 1-1 and a fixed element 1-2. As shown in FIG. 7, the rotatable element 1-1 is connectable with the cap 3 so as to clamp and fix the cover body 2 and the storage body 4 between the rotatable element 1-1 and the cap 3. The fixed element 1-2 is removably connected to the car surface via vacuum suction cups 51 (or magnetic members 18, electrostatic stickers 17, self-adhesive members 19). The rotatable element 1-1 and the fixed element 1-2 can be connected directly by insertion to form a rotatable structure with the rotatable element rotatable with respect to the fixed element; alternatively, the rotatable element 1-1 and the fixed element 1-2 can be connected via rotating components (e.g. connecting shaft and bearing) to form the rotatable structure. The base 1 according to the present embodiment has the fixed element 1-2 removably connected to the car surface, while the rotatable element 1-1 on the fixed element can rotate and perform positional adjustment along with the cover body 2, so that the cover body 2 can be more easily adjusted to a more accurate position when being used on the car, thereby reducing the amount of work and difficulty of adjusting the cover body on the car, providing obviously improved convenience.

Embodiment 6

Figure 9:
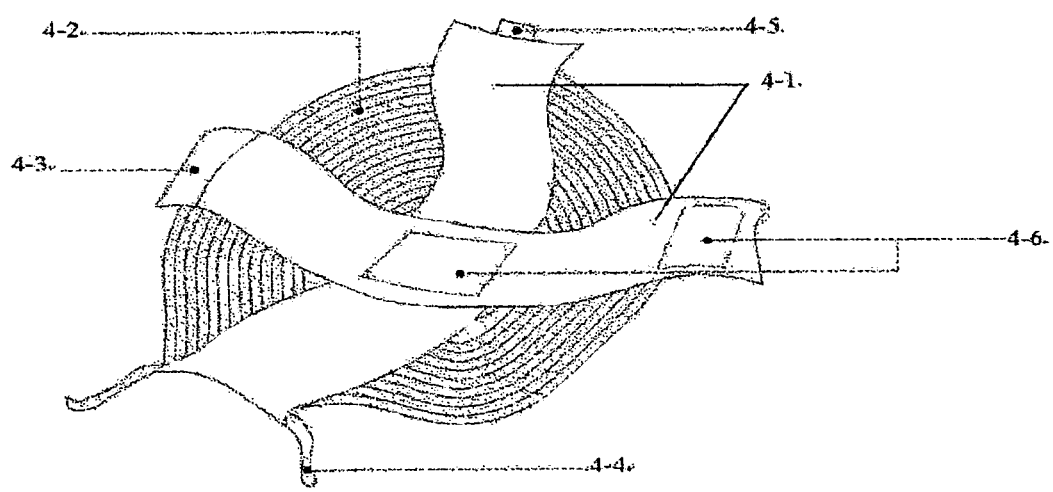
FIG. 9 is another embodiment of the storage body of the car cover assembly of FIG. 4.

Same as embodiment 1 except for the following: The storage body 4 comprises two straps 4-1 forming a cross shape. As shown in FIG. 9, an intersection of the straps 4-1 is connected to the cover body 2 (not shown in FIG. 8), and being fixed between the base 1 and the cap 3 (not shown in FIG. 9). A plurality of strings or cords 4-2 are used to connect every adjacent extended parts of the straps extended out of the intersection, thereby forming a net shape structure. Free ends of the straps 4-1 are provided with hook and loop fasteners 4-3 or tightening strings 4-4 or buckles 4-5 or magnetic pieces 4-6 (FIG. 9 is a schematic illustration of all these different choices at the ends of the straps, however it should be noted that all these different choices will not appear on the straps all at the same time) for mutual connections of the corresponding ends of the straps 4-1 when the storage body 4 is pulled upward storing the cover body 2 inside the storage body. According to this embodiment, the straps 4-1 of the storage body 4 lay flat and extend horizontally and outwardly without affecting the use of the cover body when the cover body is in use over the car. To store up the cover body, pull up the straps 4-1 so that they form a shape like a meshed bowl, and the cover body 2 can then be stored inside; finally, use any one kind of the hook and loop fasteners 4-3 or tightening strings 4-4 or buckles 4-5 or magnetic pieces 4-6 provided at the end of the straps to connect the corresponding ends of the straps to complete storage of the folded cover body 2 inside the storage body 4.

The strings or cords 4-2 connecting the straps 4-1 are made of resilient material such as rubber bands or plastic bands. Resilient strings or cords can achieve better storage effect of the cover body 2 since it is thus easier to open up the storage body to easily put the cover body inside; after the cover body is stored inside, the resilient force of the strings or cords maintains the cover body in a relatively small size and so the cover body will not expand the storage body from inside the storage body, thereby saving storage space and benefiting to portability and mobility of the car cover assembly.

The above embodiments are the preferred embodiments of the present invention. However, the present invention should not be limited to the above described embodiments. Any changes, modifications, replacements, combinations and simplification of the present invention without deviating from the essence and principle of the present invention should be considered alternative configurations with equivalent technical effects and should be included in the scope of protection of the present invention.

What is claimed is:

1. A car cover assembly, comprising a base, a cover body, a cap and a storage body that stores the cover body; the base is removably mounted on a car surface; the cap is removably or fixedly connected onto the base; the cover body and the storage body are pressed between the base and the cap; the base and the cap clamp and fix the cover body and the storage body; the cover body is entirely stored inside the storage body when being completely folded: an upper surface of the base is provided with a buckling groove or a buckle; correspondingly, a lower surface of the cap is provided with a corresponding buckle or a corresponding buckling groove; the buckle provided on one of the base or the cap is fitted into the corresponding buckling groove provided on another one of the base or the cap so that the cap is removably fitted onto the base, thereby clamping and fixing the cover body and the storage body between the base and the cap.

2. The car cover assembly of claim 1, wherein a lower surface of the base is provided with vacuum suction cups; the base adheres to the car surface via the vacuum suction cups, so that the base is removably mounted onto the car surface.

3. The car cover assembly of claim 1, wherein the storage body has a bag shape and is capable of being flattened; when the cover body is used over the car, the storage body is substantially flattened without bulging that affects the use of the cover body; when the cover body is folded, the storage body is pulled up from a flattened shape to resume the bag shape to store the cover body inside; an opening of the storage body is provided with hook and loop fasteners or tightening strings; when the cover body is stored inside the storage body, the hook and loop fasteners or the tightening strings are used to close the opening of the storage body to prevent the stored cover body from falling out of the storage body.

4. The car cover assembly of claim 1, wherein the storage body comprises two or more straps that cross one another at a respective middle point thereof; an intersection of the straps is connected to the cover body, and is fixed between the base and the cap; a plurality of strings or cords are used to connect every adjacent extended part of the straps which extends out of the intersection, thereby forming a net shape structure; free ends of the straps are provided with hook and loop fasteners or tightening strings for mutual connections thereof when the storage body is pulled upward for storing the cover body inside the storage body; the straps of the storage body lay flat and extend horizontally and outwardly from the base without affecting the use of the cover body when the cover body is in use over the car; the straps are configured to be pulled upwards so that they form a shape of a meshed bowl in which the cover body is received and once the cover body is positioned within the meshed bowl, the hook and loop fasteners or the tightening strings provided at the free ends of the straps are used to connect adjacent free ends of the straps to complete storage of the cover body inside the storage body.

5. The car cover assembly of claim 4, wherein the strings or cords connecting the straps are made of resilient material.

* * * * *